(12) United States Patent  
Garg et al.

(10) Patent No.: US 10,037,202 B2
(45) Date of Patent: Jul. 31, 2018

(54) TECHNIQUES TO ISOLATING A PORTION OF AN ONLINE COMPUTING SERVICE

(71) Applicant: MICROSOFT TECHNOLOGY LICENSING, LLC, Redmond, WA (US)

(72) Inventors: Nakul Garg, Redmond, WA (US); Ricardo Stern, Redmond, WA (US); Neelamadhaba Mahapatro, Bellevue, WA (US); Rui Chen, Bellevue, WA (US); Michael Wilde, Bothell, WA (US); Charles Jeffries, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1092 days.

(21) Appl. No.: 14/294,410

(22) Filed: Jun. 3, 2014

(65) Prior Publication Data
US 2015/0347120 A1    Dec. 3, 2015

(51) Int. Cl.
*G06F 15/173*    (2006.01)
*G06F 8/65*    (2018.01)
*H04L 12/24*    (2006.01)
*G06F 11/36*    (2006.01)

(52) U.S. Cl.
CPC ............ *G06F 8/65* (2013.01); *G06F 11/3664* (2013.01); *H04L 41/5038* (2013.01)

(58) Field of Classification Search
CPC ..... G06F 11/3664; G06F 8/65; H04L 41/5038
See application file for complete search history.

(56) References Cited

U.S. PATENT DOCUMENTS

| | | | |
|---|---|---|---|
| 7,171,432 B2 | 1/2007 | Wildhagen et al. | |
| 7,380,003 B1 | 5/2008 | Guo et al. | |
| 7,970,901 B2 | 6/2011 | Lipscomb et al. | |
| 8,024,564 B2 * | 9/2011 | Bassani | G06F 21/604 |
| | | | 713/164 |
| 8,335,851 B1 * | 12/2012 | Vendrow | G06F 8/60 |
| | | | 700/99 |
| 8,364,802 B1 * | 1/2013 | Keagy | G06F 8/63 |
| | | | 709/223 |

(Continued)

FOREIGN PATENT DOCUMENTS

WO    2008124181 A1    10/2008

OTHER PUBLICATIONS

Laflen, et al.,"Introducing New Features in the VSTS Database Edition GDR", Published on: Nov. 2008, Available at: http://msdn.microsoft.com/en-us/magazine/dd483214.aspx.
"Failover Cluster Step-by-Step Guide: Validating Hardware for a Failover Cluster", Published on: Mar. 20, 2011, Available at: http://technet.microsoft.com/en-us/library/cc732035(v=ws.10).aspx.
"Deployment planning tips for Office 365", Published on: Oct. 14, 2012, Available at: http://technet.microsoft.com/en-us/library/hh852435.aspx.

(Continued)

*Primary Examiner* — Mohamed A Wasel

(57) ABSTRACT

Techniques to isolating a portion of an online computing service are described. The following description may refer to the isolated portion as a deployment unit configured with a complete build of the online computing service. In one embodiment, after applying one or more changes to the complete build, the deployment unit may be used for testing these changes using end-to-end tests. In another embodiment, the deployment unit may be dedicated to a specific group of tenants that require at least some isolation from other tenants. Other embodiments are described and claimed.

9 Claims, 12 Drawing Sheets

(56) References Cited

U.S. PATENT DOCUMENTS

| | | | |
|---|---|---|---|
| 8,468,548 | B2 | 6/2013 | Kulkarni et al. |
| 8,839,222 | B1* | 9/2014 | Brandwine ......... G06F 11/3668 717/168 |
| 9,262,152 | B1* | 2/2016 | Kurian ..................... G06F 8/65 |
| 2006/0009996 | A1 | 1/2006 | Lipscomb et al. |
| 2006/0155777 | A1* | 7/2006 | Shih ......................... G06F 8/61 |
| 2007/0136324 | A1* | 6/2007 | Xu .................... G06F 17/30563 |
| 2009/0193445 | A1* | 7/2009 | Thakker ................ G06F 11/366 719/332 |
| 2012/0054624 | A1 | 3/2012 | Owens et al. |
| 2012/0324069 | A1 | 12/2012 | Nori et al. |
| 2013/0151681 | A1 | 6/2013 | Dournov et al. |
| 2013/0151975 | A1 | 6/2013 | Shadi et al. |
| 2013/0297769 | A1* | 11/2013 | Chang ................ G06F 9/45558 709/224 |
| 2013/0305210 | A1* | 11/2013 | Sharma ................ G06Q 10/06 717/102 |
| 2014/0087355 | A1* | 3/2014 | Henry ..................... G09B 7/00 434/362 |
| 2015/0160961 | A1* | 6/2015 | Johnson ............. H04L 63/0272 718/1 |

OTHER PUBLICATIONS

Ajman I, et al., "Scheduling and Simulation: How to Upgrade Distributed Systems", In Proceedings of the 9th conference on Hot Topics in Operating Systems, vol. 9, May 18, 2003, 6 pages.

Machiraju, et al.,"Designing Multitenant Applications on Windows Azure", Published on: Apr. 18, 2013, Available at: http://msdn.microsoft.com/en-us/library/windowsazure/hh689716.aspx.

"Types of vCloud Hybrid Service", Retrieved on: Dec. 16, 2012, Available at: http://pubs.vmware.com/vchs/index.jsp?topic=%2FGUID-FD4D5E84-1AB8-4A1B-803F-769176FCD154%2FGUID-375065F3-110A-4B84-99FA-FB8467361960.html.

Shieh, et al.,"Seawall: Performance Isolation for Cloud Datacenter Networks", In Proceedings of the 2nd UNENIX Conference on Hot Topics in Cloud Computing, Jun. 22, 2010, 7 pages.

"Secure Separation in Cisco Unified Data Center Architecture", Published on: Oct. 1, 2013, Available at: http://www.cisco.com/en//solutions/collateral/ns340/ns414/ns742/ns743/ns1050/white_paper_c11-722425.html.

International Search Report received for PCT Patent Application No. PCT/Us2015/033950, dated Feb. 23, 2016, 6 pages.

* cited by examiner

TECHNIQUES TO ISOLATING A PORTION OF AN ONLINE COMPUTING SERVICE

BACKGROUND

An online computing service may be continuously updated with changes to meet the demands imposed by production traffic and provide business value. There are considerable risks involved with updating a component of the online computing service. Different online computing services employ conventional mechanisms to manage the conflicting requirements of managing the risk and deploying fixes/customer-asks with high agility and negligible customer impact.

There are multiple types of test environments for resembling a production environment in some capacity. However, no matter how close the test environment is to the production environment, the production environment most likely will have some unique characteristics distinguishing it from test environments. There is a strong possibility of discovering issues in the production environment even when a change has been validated in the test environments. Furthermore, employing multiple test environments increases costs significantly. In addition, before a change is rolled out to the production environment, development teams employ deployment verification tests that are run on each changed component. These tests, however, do not resemble real-world scenarios that normally occur in the production environment. Typically, deploying the changed component across the online computing service consumes multiple days.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to isolating a portion of an online computing service for various purposes. Some embodiments are particularly directed to techniques to isolating a portion of online computing service for validating a new/upgraded build of the online computing service and/or for segregating production traffic from a specific subset of users. Validation of the new/upgraded build may be accomplished via testing of a service instance associated with the new/upgraded build. In one embodiment, for example, an apparatus may comprise a management application stored on a set of memory units and operative on a processor. The management application may comprise a deployment component arranged to partition a resource capacity into deployment units of which each of the deployment units comprises a set of computing roles corresponding to running an online computing service for handling production traffic provided by a plurality of users. The deployment unit may be further arranged to migrate a deployment unit from a production endpoint into another endpoint, to modify one or more computing roles associated with the deployment unit to generate a modified deployment unit on the other endpoint, and to utilize the modified deployment unit for at least a portion of the production traffic. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
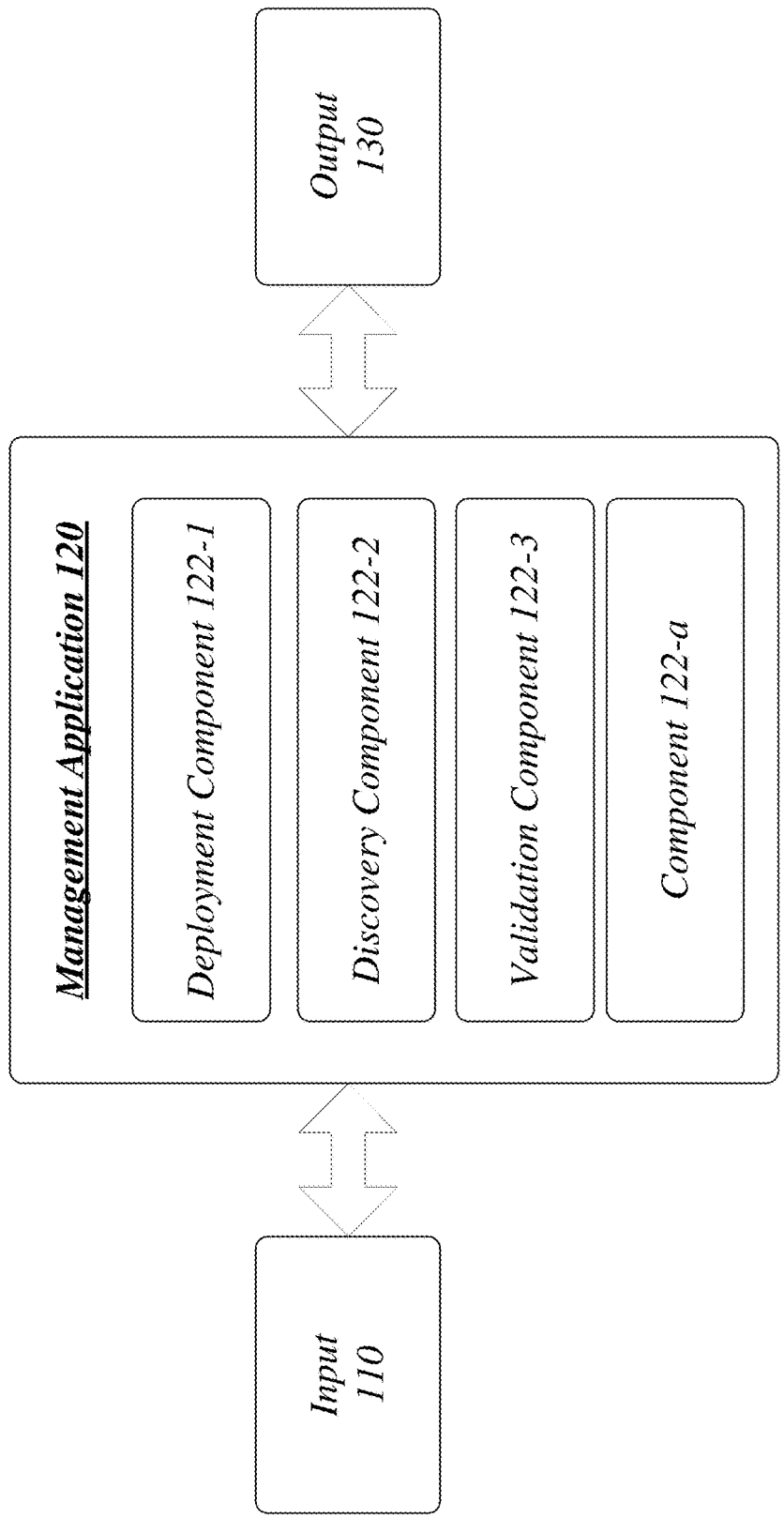
FIG. 1 illustrates an embodiment of a system to validate an online service.

Various embodiments are directed to validate a new online computing service instance for execution of an upgraded build in a production data center by creating an endpoint that does not require a significant portion of resource capacity for testing/validation, and therefore, does not affect current production traffic. In one embodiment, this endpoint may be considered temporary or ephemeral. In another embodiment, this endpoint eventually becomes a new or next production endpoint and therefore, requires a permanent portion of the resource capacity. As described below, the upgraded build may result from one or more changes applied to a previous build, including hot-fixes, custom or new features, and/or the like.

Testing of the upgraded build is performed in production data centers using production servers and networking infrastructure. Such testing is end to end, involving a complete set of computing roles to ensure that not only the role/server functions correctly but the entire system works correctly. Such testing may simulate real-world scenarios related to the online computing service. In one example embodiment, major or minor changes may be rolled out if a problem arises after deploying the upgraded build. As an example, the production traffic may re-routed to an endpoint associated with an older build of the online computer service.

The various embodiments described herein allow for the deployment of new/replacement software and/or other changes to the online computing service to be either propagated across all service instances with a single deployment, or concentrated to an isolated service instance in order to support specific tenants. The online computing service includes computing roles that have persistent data stores as well as stateless computer roles that do not have persistent data stores. Some persistent data stores can be shared across isolated service instances, such as those that contain non-sensitive data, such as spam signatures.

Instead of using dedicated cloud service components and endpoints that are independently managed, the various embodiments described herein allow for aspects of the online computing service architecture to be shared. In one embodiment, by partitioning the online computing service service's resource capacity into deployments units, each representing complete builds of the online computing service, as described herein, the complete build may be upgraded and tested through one deployment unit. When the upgraded complete build is validated, the deployment unit may be used for actual production traffic from tenants. In another embodiment, the deployment unit may support tenants that request complete isolation from other tenants.

As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a management application 120 comprising one or more components 122-*a*. Although the system 100 shown in FIG. 1 has a limited number of elements in a certain topology, it may be appreciated that the system 100 may include more or less elements in alternate topologies as desired for a given implementation. Input 110 and Output 130 represent input/output activity associated with the system 100 in general.

It is worthy to note that "a" and "b" and "c" and similar designators as used herein are intended to be variables representing any positive integer. Thus, for example, if an implementation sets a value for a=5, then a complete set of components 122-*a* may include components 122-1, 122-2, and 122-3. The embodiments are not limited in this context.

The system 100 may comprise the management application 120, which may be generally arranged to generate a new service instance for an online computing service, establish a new endpoint for serving that new service instance to users, and assign a set of servers to the new endpoint. These servers may include resources dedicated to operating various computing roles for the new service instance. The management application 120 may be configured to apply one or more changes to the computing roles, for example, in order to upgrade the computing roles to a new build/version of the online computing service. As described below, these changes may be rigorously tested in a validation process prior to deployment onto other production endpoints for the online computing service. Alternatively, the management application segregates the computing roles from other servers associated with other services instances that serve the same domain of users, thereby creating a virtual endpoint.

The management application 120 may comprise a deployment component 122-1 generally arranged to modify the computing roles of the online computing service with new/replacement software code in a manner that does not considerably impact any user's experience or productivity. Once modified, the new computing roles are tested and those test results are analyzed during a validation process. If valid, the modified computing roles are migrated to the production endpoint where they become available for processing production traffic (e.g., customer or tenant data).

In one embodiment, the deployment component 122-1 may migrate a set the computing roles to the endpoint that comprise a complete build of the online computing service. By migrating this set of computing roles, end-to-end transactions may be invoked at the endpoint with only this set of computing roles. Hence, this set of computing roles may be referred to as a deployment unit. It is appreciated that in some embodiments, the set of computing roles may include stateless roles and zero, one, or more state-full roles.

The management application 120 may comprise a discovery component 122-2. Within the online computing service architecture, the discovery component 122-2 controls routing of the production traffic. The discovery component 122-2 may be generally arranged to manage routing data for the online computing service. In one embodiment, the deployment component 122-1 directs the discovery component 122-2 to process the routing data and route all production traffic away from the deployment unit comprising the above-mentioned set of computing roles.

The management application 120 may comprise a validation component 122-3. The validation component 122-3 may be generally arranged to perform a validation process on the modified deployment unit that comprises a variety of tests to measure performance, cost and/or other qualities. The validation component 122-3 performs all testing in production data centers using production servers and networking infrastructure. Testing is end to end involving all computing roles to ensure not only the role/server functions correctly but the entire system works correctly. Such testing may simulate real-world scenarios related to the online computing service. The validation component 122-3 may rollout major or minor changes if a problem arises after deploying an upgraded build of the online computing service. As an example, the discovery component 122-2 may re-route the production traffic to an endpoint associated with an older build of the online computer service.

Figure 2:
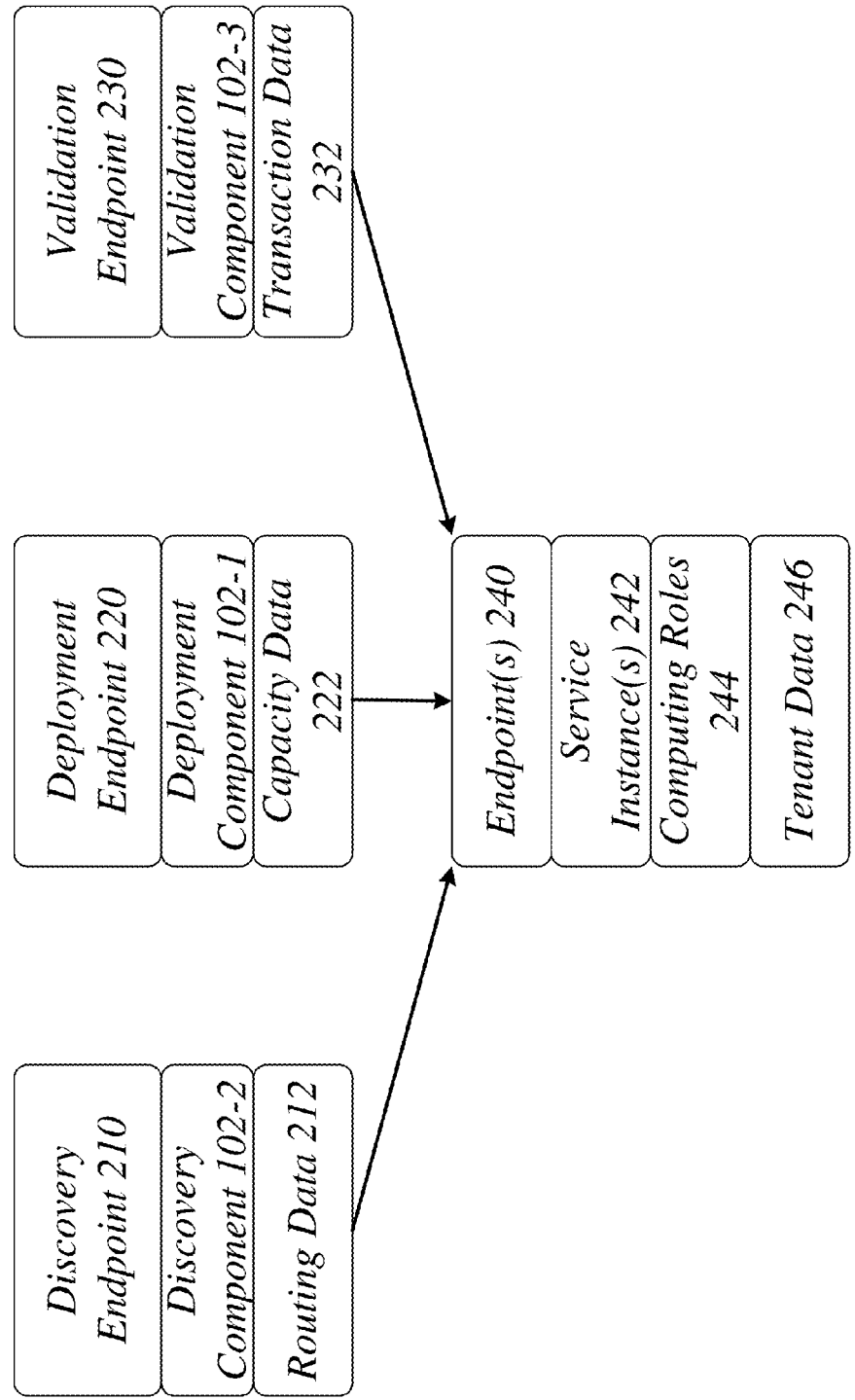
FIG. 2 illustrates an embodiment of a set of components for an online computing service.

FIG. 2 illustrates an embodiment of an operating environment 200 for the system 100. As shown in FIG. 2, the operating environment 200 includes a plurality of endpoints on which various computing resources for the system 100 are configured. Each endpoint may include one or more computing devices (e.g., servers) configured to execute one or more tasks that in some manner support an online computing service, such as a cloud computing service. As noted above, the online computing service as described herein may operate over one or more data networks in order to provide a plurality of computer users (e.g., endpoint users) with data and/or applications. FIG. 2 illustrates some example endpoints, including a discovery endpoint 210, a deployment endpoint 220, a validation endpoint 230 and endpoints 240, but it is appreciated that other endpoints are envisioned by the present disclosure. The endpoints 240 may corresponding to an instance of the online computing service. These endpoints include various computing roles of which a certain group or configuration of computing roles may represent a complete build for the online computing service described above for FIG. 1 through which end-to-end transactions may be executed.

One example endpoint, the discovery endpoint 210, includes the discovery component 122-2 configured to run the online computing service's discovery service for routing the production traffic. The discovery component 122-2 is operative on the discovery endpoint 210 and is configured to process routing data 212. In one embodiment, the discovery component 122-2 processes the routing data 212 when directing the production traffic to specific endpoints amongst the endpoints 240; hence, these specific ones of the endpoints 240 may be referred to as production endpoints.

Another example endpoint is the deployment endpoint 220, which may refer to a server or servers that execute the deployment component 122-1 and, when appropriate, use the discovery component 122-2 running on the discovery endpoint 210 and/or the validation component 122-3 running on the validation endpoint 230 to perform a validation process.

In one embodiment, the deployment component 122-1 utilizes resource capacity data 222 in order to examine a network topology for the plurality of endpoints, such as a network topology for a data center comprised of several server computing devices that run one or more online computing services. The network topology may include information identifying which server computing devices provide data storage and/or processing tasks known as computing roles and which computing role is operative on a particular server device. The deployment component 122-1 may use the network topology to identify a set of computing roles that represent a full implementation of the online computing service's instance. The full implementation may be configured to process incoming/outgoing traffic on behalf of the endpoint users in end-to-end fashion. The set of computing roles may be herein referred to as a deployment unit. One example computing role, a hub role, may generally refer to a server or servers that handle the incoming/outgoing traffic directed to the deployment unit (e.g., the deployment unit's network address). For instance, the hub role may handle all incoming/outgoing email flow, apply transport rules, apply journaling policies, and deliver messages to a recipient's mailbox. Another example computing role may screen incoming/outgoing email traffic and filter out emails with SPAM, viruses and other malware.

In one example embodiment where a change is to be applied to the set of computing roles, the deployment component 122-1 may process the routing data 212 to direct the incoming traffic away from the deployment unit comprising the set of roles. This may be accomplished by modifying the routing data 212 to remove any mappings between the set of computing roles and the endpoints 240, thereby terminating any association with the previous online computing service instance. The deployment unit is identifiable as usable resources. After generating another (e.g., new) online computing service instance and establishing another endpoint on that service instance, the deployment component 122-1 associates the set of computing roles with the other endpoint, which places the computer roles under the direction of the other service instance, completing the migration of the deployment unit to the other service instance. Note, the production traffic is re-routed through other production endpoints of the previous service instance and any user(s) associated with re-routed production traffic is, for the most part, unaffected by the migration.

According to one example embodiment, the deployment component 122-1 modifies the set of computing roles by applying one or more changes to computer program code (e.g., instructions) and/or data stored on the server computing devices that comprises the deployment unit. After implementing the one or more changes, the set of computing roles becomes transformed into a set of changed computing roles.

Another example endpoint, the validation endpoint 230, includes the validation component 122-3 for running end-to-end tests on some on some of the service instances 242. In one example embodiment, the deployment component 122-1 initiates testing of the changed set of computing roles. One example implementation of the validation component 122-3 engages in end-to-end testing by communicating transaction data simulating real-world production traffic. The transaction data allows evaluation of the changed set of computing roles under real world conditions. In the context of online mailbox protection, communicating the transaction data causes the computing roles 244 to perform various email filtering tasks, such as SPAM filtering, malware detection and/or the like.

Figure 3:
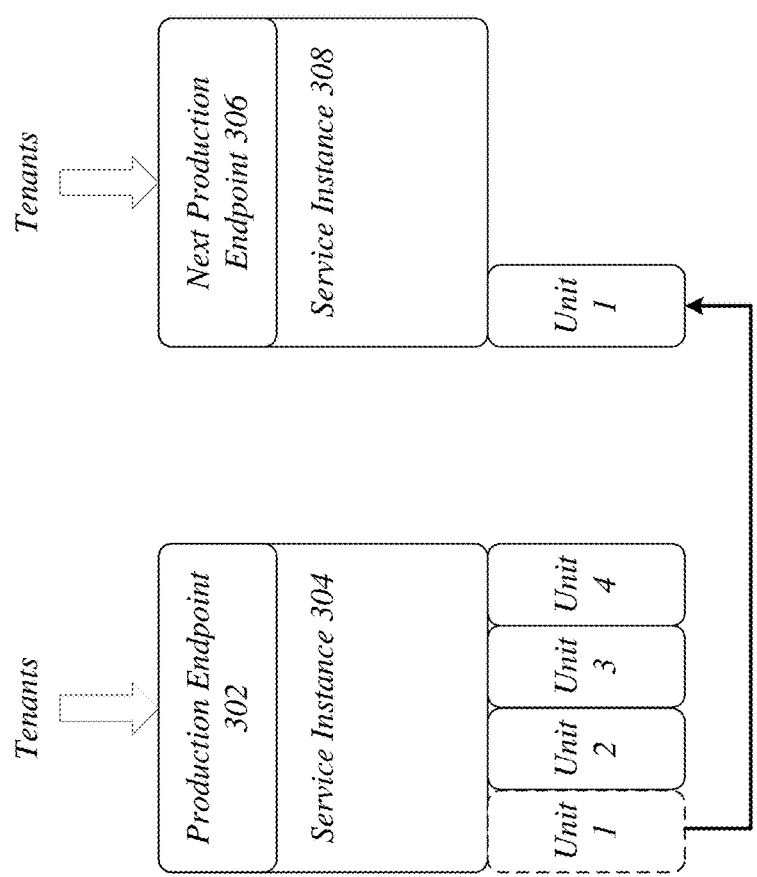
FIG. 3 illustrates an embodiment of a validation process for an online computing service.

FIG. 3 illustrates an embodiment of an operating environment 300 for the system 100. As shown in FIG. 3, the operating environment 300 includes a (current) production endpoint 302 associated with a service instance 304 and a next production endpoint 306 associated with another service instance 308.

The production endpoint 302, for example, may be configured with a plurality of computing devices known as servers that, in coordination, provide an online computing service, such as the service instance 304, to a plurality of tenants. Various parameter data associated with these tenants may determine which production endpoint to be routed as described herein. A management application (e.g., the management application 120 of FIG. 1) may allocate the production endpoint 302 with a quantifiable resource capacity in terms of, by way of example, processing power, storage space, computing capabilities (e.g., platform capabilities) and/or the like. The resource capacity, according to one embodiment, may define a set of deployment units dedicated to serving the service instance 304 to the plurality of tenants for the production endpoint 302. The set of deployment units may be illustrated in FIG. 3 as "Unit 1", "Unit 2", "Unit 3", and "Unit 4" of which each deployment unit represents one or more servers that operate the service instance 304. Each server within any given deployment unit may be configured to operate a specific computing role for the service instance 304, such as a web service role, a hub role, an edge role, a filtering role, and so forth. Each deployment unit includes a set of computing roles that are substantially or completely isolated from other computing roles in the online computing service's network topology. In some embodiments, the deployment units themselves also are isolated from other deployment units in the same network topology.

As depicted in FIG. 3, deployment unit "Unit 1" is migrated from the production endpoint to the next production endpoint 306. According to one example embodiment, the resource capacity allocated to the production endpoint 302 is partitioned and a portion of that capacity is assigned to the next production endpoint 306. A set of servers running a set of computing roles for the service instance 304 may be removed from that instance's resource pool and associated with another resource pool, such as an expected resource pool for the service instance 308. After applying a change to the deployment unit "Unit 1" (including any roll-back operation of a previous change or update to set of computing roles) and prior to deployment upon production traffic, the changed deployment unit "Unit 1" is validated through testing, for example, via the validation component 122-3 of the management application 120 described herein.

Once validated, the changed deployment unit "Unit 1" is deemed ready to handle actual production traffic and accordingly, is deployed as part of a live production environment. Routing data for a specific group of tenants is modified such that traffic generated from these tenants is directed towards the next production endpoint's address. According to one example implementation, these tenants' production traffic is redirected away from the production endpoint 302 and towards the next production endpoint 306, specifically towards the set of servers within the changed deployment unit "Unit 1." It is appreciated that the tenant's production traffic may be communicated to a server operating a specific computing role for the service instance 308 and that server orchestrates the other computing roles corresponding to the online computing service. Hence, that server's computing role may include functioning as an interface (e.g., a web interface).

By repeating at least a portion of the process described above, one or more of the remaining deployment units in the production endpoint 302 may be migrated to the next production endpoint 306 and after validation, may begin serving tenants under the service instance 308. It is appreciated that in other embodiments, none of the remaining deployment units in the production endpoint 302 are migrated. In these embodiments, the operating environment 300 maintains backwards compatibility for the tenant's production traffic. Some tenants utilize the unchanged service instance 304, which may be running an outdated/previous version of the online computing service, while other tenants are served by the updated service instance 308. If any tenant wishes to switch to the updated service instance 308, the deployment component 122-1 of the management application 120 redirects that tenant's production traffic to the changed deployment "Unit 1"; and similarly, if any tenant wishes to switch back to the unchanged service instance 304, that tenant's production data is redirected to one of the deployment units remaining in the production endpoint 302. After a roll back is performed and the changed deployment unit "Unit 1" is reverted to a previous version, the reverted deployment unit "Unit 1" may be migrated back to the production endpoint 302.

Figure 4:
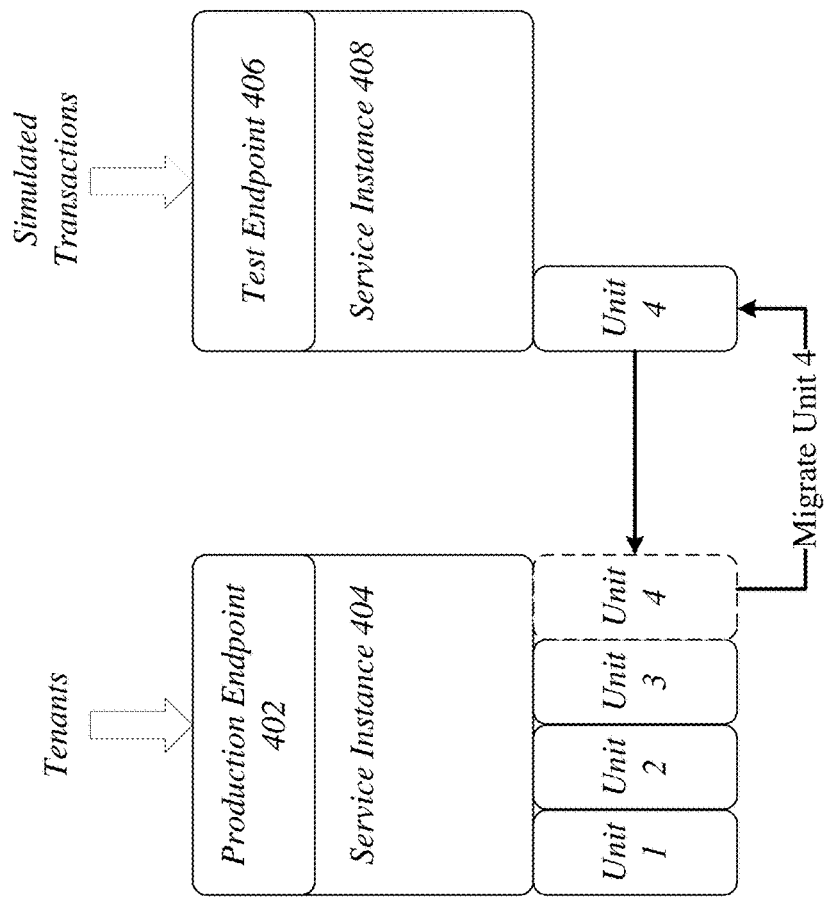
FIG. 4 illustrates an embodiment of alternate validation process for an online computing service.

FIG. 4 illustrates an embodiment of an operating environment 400 for the system 100. As shown in FIG. 4, the operating environment 400 comprises a plurality of service instances, each further comprising one or more endpoints including a production endpoint 402 configured on a service instance 404 and a temporary test endpoint 406 associated with another service instance, service instance 408. As described herein with respect to production endpoints in general, the production endpoint 402 is allocated a resource capacity for serving a plurality of users with data processing and/or storage related tasks, such as those related to an online computing service.

The following description for FIG. 4 describes example embodiments related to when the operating environment 400 provides an online mailbox protection service over a network to the plurality of (mailbox) tenants. The production endpoint 402 may be associated with a network address (e.g., a URL) that receives all incoming and outgoing message data related to an organization, such as an enterprise's internal email system. The above described resource capacity may be partitioned amongst the production endpoint 402 and the test endpoint 406. Because the test endpoint 406 is temporary, any resource capacity assigned to the test endpoint 406 is ephemeral and has a negligible impact on tenant experience. Amongst all computing devices in the operating environment's network topology, the deployment component 122-1 of the management application 120 identifies a set of computing roles (e.g., servers) that, when combined, form a complete build (e.g., full installation) of the online mailbox protection service. In one example embodiment, the identified set of computing roles are isolated from other computing roles in the operating environment 400 and therefore, do not communicate with these roles. As described herein, when the identified set of computing roles operate as the complete build, full end-to-end testing may be executed. Furthermore, changing the complete build may be implemented, tested and deployed without impacting the plurality of tenants' messaging activities.

The deployment component 122-1 of the management application 120 may configure the identified set of computing roles into a deployment unit, such as a deployment unit depicted in FIG. 4 as "Unit 4," and migrate that deployment unit to the service instance 408. One or more of the set of computing roles may be changed, updated and/or replaced, causing inter-role configurations between the set of computing roles to be updated such that inter-role communications are directed to the changed computing role. For example, if the enterprise's web email client interface is updated, a web service computing role may be modified with different code.

Other computing roles within the test endpoint 406 are directed to the changed web service computing role. Other changes may also be performed, such as updating/changing other computing roles, updating/changing other software programs, adding custom mailbox protection features, updating operating system settings and/or the like. Once fully configured as a complete build with the changes, testing of the changed set of computing roles may be initiated by the validation component 122-3 of the management application 120. That component may reside in another endpoint communicably coupled to the test endpoint 406, which may referred to as a validation endpoint. For example, the validation component 122-3 may run tests comprising simulated mailbox-related transactions (e.g., incoming/outgoing emails) upon the deployment unit "Unit 4" and analyze any test results in accordance with various performance-based metrics. The test results, for example, may record successes/failures of email filtering operations, such as SPAM and malware scanning. If the test results indicate a successful transition to the changed computing roles, the deployment unit "Unit 4" is migrated back to the service instance 404 and brought under the control of the production endpoint 406. Each remaining deployment unit on the production endpoint 406 may be migrated to the test endpoint for an upgrade and, possibly, for testing; and if the modified deployment unit successfully completes the validation process, the modified deployment unit is migrated back to the production endpoint 402 and deployed for production traffic.

In some example embodiments, when one or more of these changed/updated computing roles are tested and the change causes problems handling user message data changes can be rolled back. According to one example roll-back operation, a changed computing role's software code is replaced with a previous version of that computing role. According to another example, the management application may instruct the server operating as the changed role to use the previous version of the changed computing role instead of the changed computing role. After being rolled-back, the deployment unit "Unit 4" may be migrated back to the service instance 404.

Figure 5:
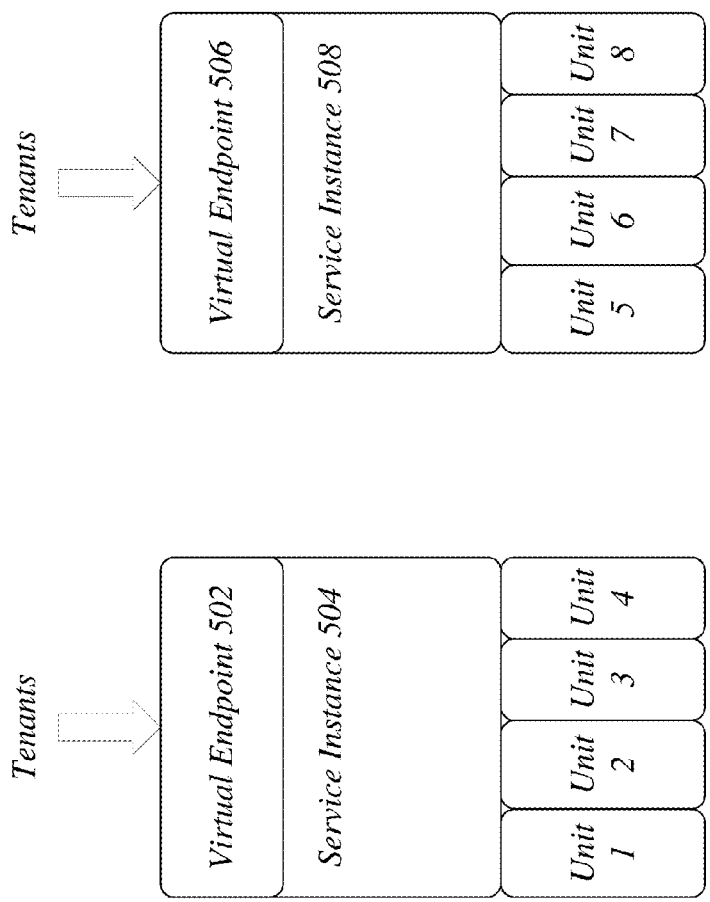
FIG. 5 illustrates an embodiment for isolating production traffic for an online computing service.

FIG. 5 illustrates an embodiment of an operating environment 500 for the system 100. As shown in FIG. 5, the operating environment 500 comprises a virtual endpoint 502 and a virtual endpoint 506 corresponding to a service instance 504 and a service instance 508, respectively. Combined, the virtual endpoint 502 and the virtual endpoint 506 may represent at least some resource capacity for an online computing service. As described herein, a resource capacity refers to various server or computing roles of which some may be stateless and some may be state-full. Each virtual endpoint is allocated a plurality of computing roles that comprise a number of complete builds of the online computing service. There are various degrees to which each virtual endpoint's resource capacity may be isolated from the other virtual endpoint's resource capacity. In some embodiments, the virtual endpoint 502 may be completely isolated from the virtual endpoint 506 by not sharing any resources, persistent databases, and/or computing roles. In some embodiments, certain state-full roles are maintained as shared resources, such as a globally shared database storing SPAM or malware signature data.

Within the plurality of computing roles, a deployment unit may define a set of computing roles that, independent of any other computing role, represent one complete build. Hence, each endpoint includes a set of deployment units that are isolated from other deployment units in a network topology for the online computing service. The resource capacity is partitioned into these isolated units. In one embodiment, the virtual endpoint 506 comprises an isolated build that has been changed to adapt to that virtual endpoint's users. As an example, sensitive email traffic for top level government officials may be segregated from other government email traffic originating from a same region by directing the other government email traffic email traffic to the virtual endpoint 502 and directing the sensitive email traffic to the virtual endpoint 506. An example operating environment for such an example may be described for FIG. 8.

Figure 6:
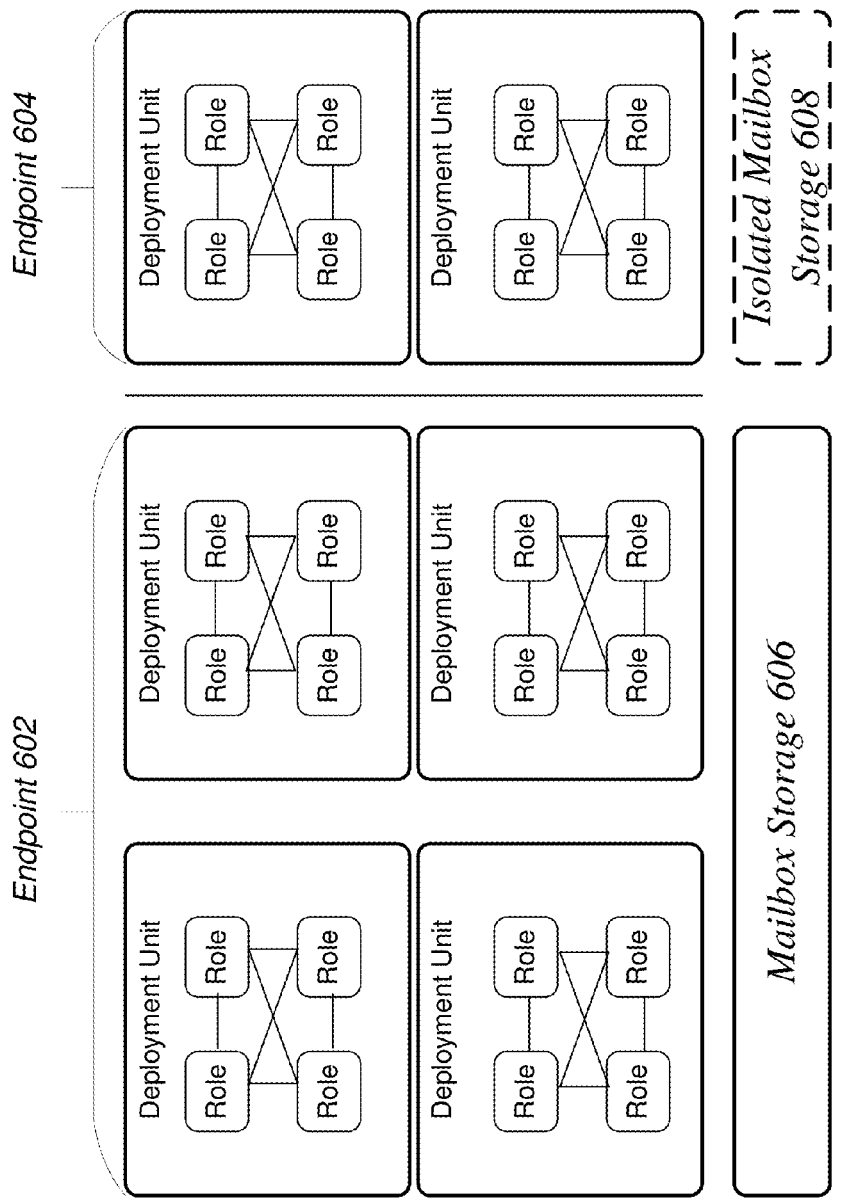
FIG. 6 illustrates an embodiment of a deployment unit for running an online computing service.

FIG. 6 illustrates an embodiment of an operating environment 600 for the system 100. As shown in FIG. 6, the operating environment 600 includes a network topology of computing devices (referred to as servers) representing a resource capacity allocated to one or more online computing service instances. Each deployment unit depicted in FIG. 6 comprises a set of computing roles operating as complete build of an online computing service instance that may execute end-to-end transactions, such as incoming and outgoing email filtering transactions.

In one embodiment, the deployment component 122-1 has the ability to move servers or roles of a deployment unit from one endpoint to another endpoint. In one embodiment, the deployment component 122-1 is configured to add the servers in the deployment unit to expected pools in load balancers associated the other endpoint and remove them from any unexpected pools, restrict inter-role communications to internal servers of the deployment unit, and associate (e.g., tag) the deployment unit with the other endpoint.

The deployment units depicted in FIG. 6 may be dedicated to operating an endpoint protection service, such as a mailbox protection service. As described herein, the discovery component 122-2 functions as an endpoint discovery service that is used to route email traffic for a given tenant to specific endpoints or specific deployment units within an endpoint. A large commercial enterprise, for example, may be allocated multiple mailbox protection service instances where each instance contains a collection of related endpoints that serve a subset of tenants within a given domain (e.g., tenants belonging to a same geographic region).

The mailbox protection service supports various protocols for communicating production traffic, such as SMTP and HTTPS. For SMTP incoming traffic, the discovery component 122-2 routes a tenant's emails to a deployment unit or units by implementing DNS functionality. For incoming HTTPS traffic, the discovery component 122-2 re-routes a tenant's emails using HTTP-redirect where every web server communicates with the discovery component 122-2 to identify the right endpoint or deployment for servicing the tenant.

When deploying a change (e.g., a major change or update), the deployment component 122-1 instructs the discovery endpoint 122-2 to segregate endpoint 602 directed traffic and endpoint 604 directed traffic, for example, for experimentation or to isolate the endpoint 604 to a subset of tenants. Hence, given a tenant, the discovery component 122-2 may route the tenant's email traffic to either the endpoint 602 or the endpoint 604. In one embodiment, the deployment component 122-1 may partition a resource capacity allowing allocation of deployment units to either the endpoint 602 or the endpoint 604 and after migrating the deployment units to their respective endpoints, the deployment component 122-1 may share access to mailbox storage 606 amongst the endpoint 602 and the endpoint 604. The mailbox storage 606 generally stores tenant mailboxes for the enterprise's email users. As an option, some mailboxes may be held in isolated mailbox storage 608 to which the endpoint 604 is granted access.

The deployment component 122-1, as described herein, may apply one or more changes to a deployment unit and update that unit's current build into a new build for the mailbox protection service. Each deployment unit includes servers of all the computing roles so that the new build's end-to-end functionality may be tested using simulated transactions and if such testing indicates validity, exposed to tenants by deploying only that deployment unit. The validation component 122-3 may represent a test automation machine within the same data center as the deployment units that is configured to run tests on the new build's end-to-end functionality.

Figure 7:
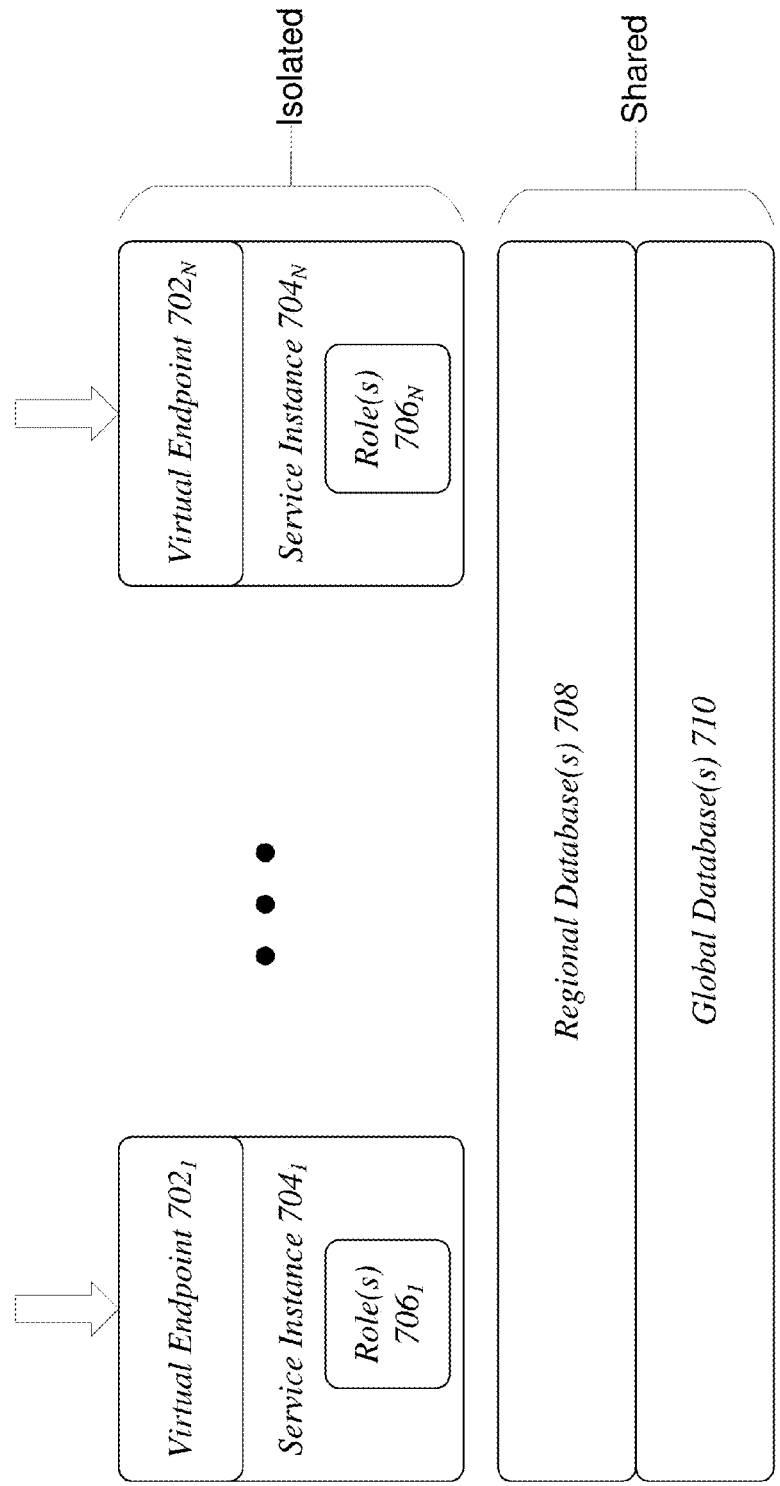
FIG. 7 illustrates an embodiment of an online computing service featuring isolated endpoints.

FIG. 7 illustrates an embodiment of an operating environment 700 for the system 100. In one example embodiment, the operating environment 700 refers to a cloud or online computing service architecture in which a virtual endpoint is adapted to isolate specific tenant production traffic while leveraging at least some shared infrastructure. As shown in FIG. 7, the operating environment 700 includes a plurality of virtual endpoints $702_1 \ldots _N$ of which a given virtual endpoint 702 is configured on a service instance 704. Each virtual endpoint 702 also comprises a set of computing roles 706 for operating the service instance 704. In one embodiment, each set of computing roles 706 has the quality of being stateless (e.g., non-persistent) and isolated from the other virtual endpoints while state-full computing resources are shared across the plurality of virtual endpoints $702_1 \ldots _N$. FIG. 7 depicts regional databases 708 and global databases 710 as examples of shared state-full computing resources.

One example implementation may designate an example virtual endpoint $702_1$ as a dedicated endpoint for a specific subset of tenants while isolating other tenant production traffic to at least one of remaining virtual endpoints $702_2 \ldots _N$. Such isolation may be permanent or temporary. For example, the subset of tenants may be selected at random to test an upgraded build of the online computing service.

The subset of tenants may have certain criteria necessitating isolation to the dedicated endpoint. In one example, email traffic for a group of government tenants are not co-mingled with that of commercial or civilian tenants in the operating environment 700. This allows for the government tenants to have their data isolated from that of others who are non-government. In another example, a government tenant levies a requirement on an online computing service provider that the software and hardware that are used to process their email and data may only be accessed by that provider's employees who have certain security clearances and meet citizenship requirements. The hardware and software in the online computing service can be isolated architecturally and logically to only allow employees who are administrators or engineers who meet the requirements by the government tenant to be able to access the online computing service. At the same time, the other instance of the online computing service would be available for administrators and engineers to access and maintain the service.

Figure 8:
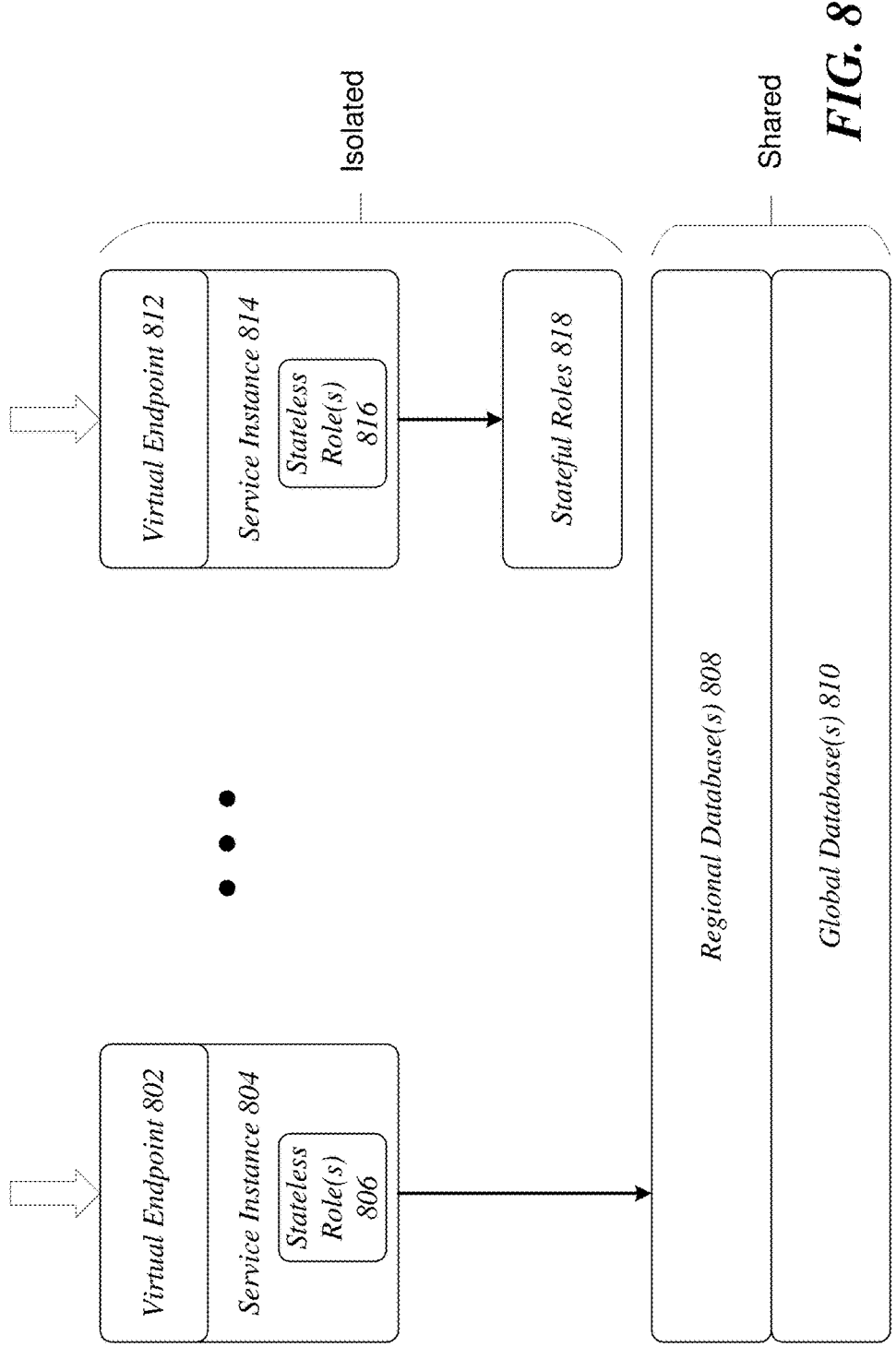
FIG. 8 illustrates another embodiment of an online computing service featuring isolated endpoints.

FIG. 8 illustrates an embodiment of an operating environment 800 for the system 100. As shown in FIG. 8, the operating environment 800 almost completely isolates the virtual endpoint 812 from other virtual endpoints, such as when a service instance 814 is dedicated to serving a particular group of tenants, such as executive government officials. In addition to stateless roles 816, the virtual endpoint 812 includes state-full roles 818 that are not shared amongst the other virtual endpoints. These state-full roles 818 may include persistent databases storing non-sensitive data, such as SPAM or malware signatures.

Given a fixed group of servers operating a set of computing roles, these servers may be segregated such that software may be deployed to these servers while maintaining virtual isolation between virtual domains in the online computing service. Each service instance can be configured with its own virtual endpoint. As described above for FIG. 7, some embodiments of the deployment component 122-1 may isolate only the stateless computing roles 816. In FIG. 8, in addition to isolating all the stateless roles 816, some state-full roles 818 are isolated into the virtual domains, such as when specific tenant data is to be isolated from other tenant data. In this case, the software in the state-full role would provide virtual isolation from other service instances. Optionally, the entire group of roles or servers can be isolated to support separate dedicated service instances. Hence, the deployment unit may be adapted dynamically to provide a service instance ranging from maximum resource sharing to maximum isolation.

Figure 9:
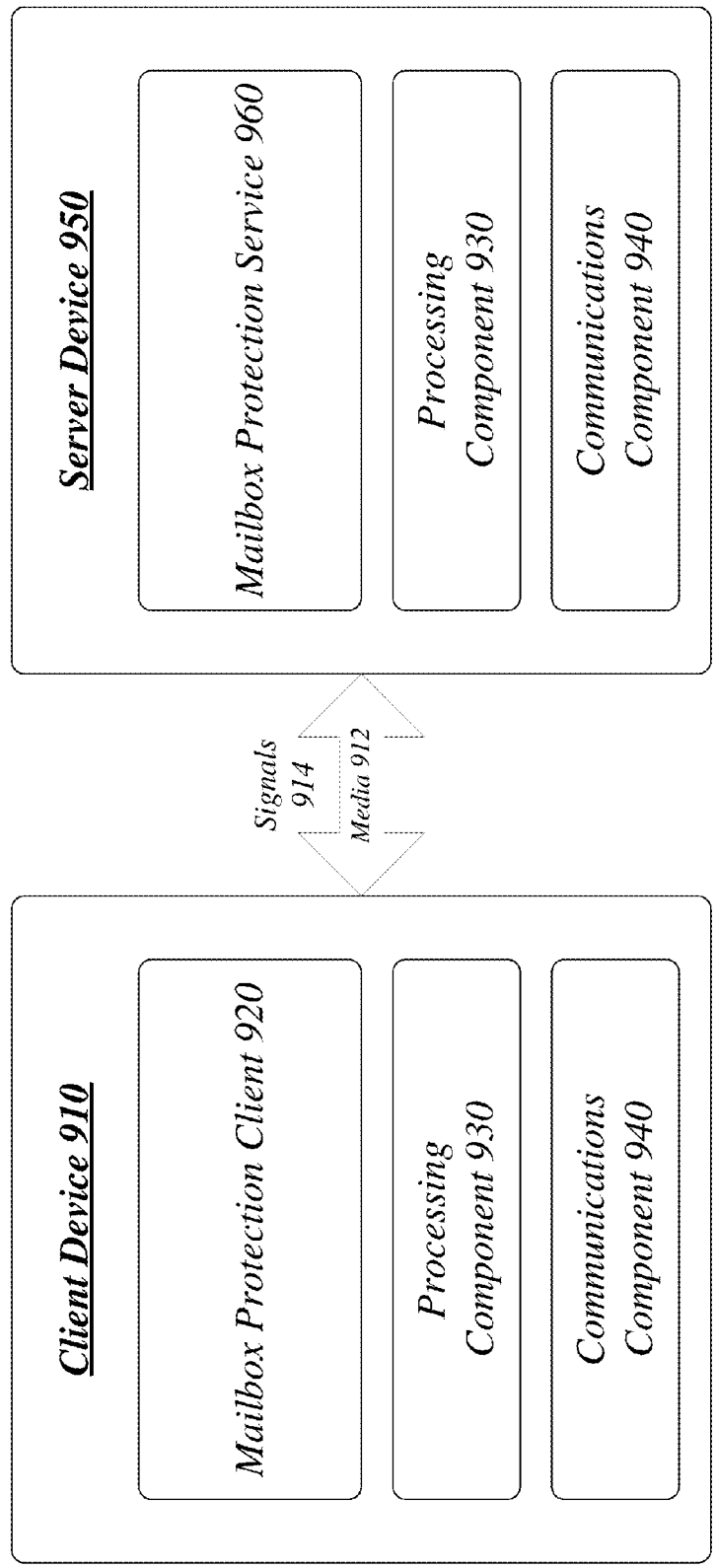
FIG. 9 illustrates an embodiment of a distributed system for the system of FIG. 1.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In one example, the devices 910, 950 may communicate over a communications media 912 using communications signals 914 via the communications components 940.

In general, the client device 910 and/or the server device 950 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The client device 910 and/or the server device 950 may execute processing operations or logic for the system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The client device 910 and/or the server device 950 may execute communications operations or logic for the system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client device 910 may comprise or employ one or more client programs that operate to perform various methodologies in accordance with the described embodiments. In one embodiment, for example, the client device 910 may implement a mailbox protection client 920 that functions as an interface to an online computing service referred to as a mailbox protection service. The mailbox protection client 910 may be a component (e.g., a plug-in) of an email messaging application in use at the client device 910 and configured to present mailbox information, send/receive email and other email-related tasks.

The server device 950 may comprise or employ one or more server programs that operate to perform various methodologies in accordance with the described embodiments. In one embodiment, the server device 950 may implement at least a portion of a mailbox protection service 960. To illustrate by way of examples, the server device 950 may operate a computing role that processes incoming production traffic from the client device 910 or the server device 950 may operate the entire mailbox protection service.

Alternatively, the service device 950 may represent a plurality of server devices that cooperate to operate the mailbox protection service 960.

In one embodiment, the mailbox protection service 960 processes incoming emails to the client device 910 for any possible threats or problems. The incoming emails may be forwarded to the server device 950 from by the client device 910 itself or a local on-premises enterprise server that handles all network traffic in and out of the client device 910. Optionally, the incoming emails may be directly routed to the server device 950. Possible threats include, but not limited to, malware, SPAM, phish and/or any other software vulnerability exploit.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
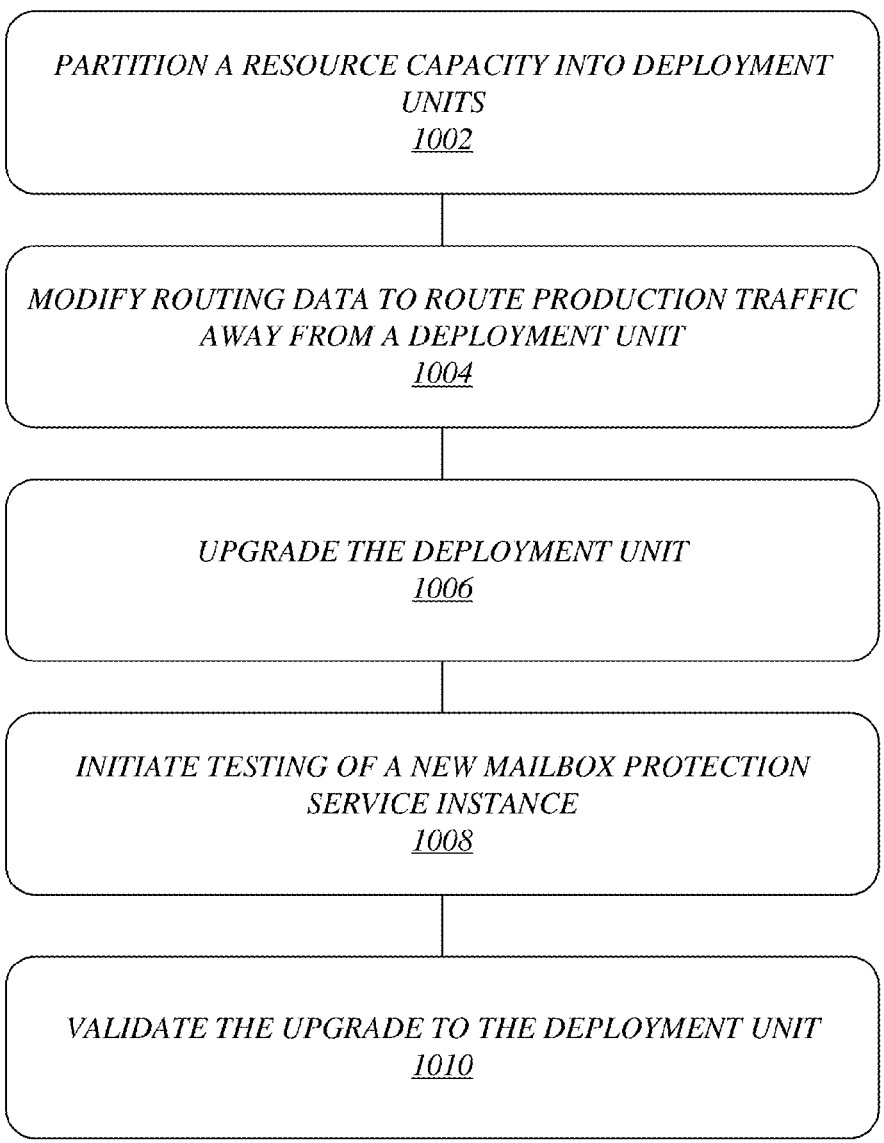
FIG. 10 illustrates an embodiment of a logic flow for the system of FIG. 1.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 partitions a resource capacity into deployment units at block 1002. For example, each deployment unit may include a set of servers operating various computing roles for the mailbox protection service.

The logic flow 1000 may modify routing data to route production traffic away from one of the deployment units at block 1004. For example, the deployment unit's servers may be added to expected resource pools in load balancers that are used by the other mailbox protection service instance's endpoints and removed from an expected resource pool for the service instance. Hence, these servers' resources are no longer be available for handling tenant production traffic. Any N-tier communication may be restricted to internal endpoints of the service instance and/or to internal roles within a deployment unit. This inter-role routing configuration on the machines is modified as a server is moved to a new service instance.

As an alternative, by partitioning the mailbox protection service's resource capacity into deployments units as described herein, the deployment component 122-1 of the management application 120 may generate a mailbox protection service instance to support service tenants that request complete isolation from other tenants. In one embodiment, the deployment component 122-1 isolates a service instance across stateless roles and at least some state-full roles where complete service isolation is desired.

The logic flow 1000 may upgrade the deployment unit at block 1006. For example, one or more servers within the deployment unit may be updated with new/replacement software code and/or customized features. An example computing role, for instance, a web service role, may be changed to fix one or more program bugs and/or to perform one or more custom functions. Another example computing role may be changed to include new malware removal mechanisms and/or new malware signature data. As a part of this upgrade, the deployment component 122-1 may migrate a portion of the resource capacity to the other service instance's endpoints. At this point, the deployment unit is configured the other service instance's endpoints and that deployment unit is brought online, becoming available for handling actual production traffic.

The logic flow 1000 may initiate testing of a new mailbox protection service instance at block 1008. For example, test tenants may invoke end-to-end tests upon the deployment unit. The validation component 122-3 of the management application 120 may run simulated transactions on the deployment unit. The deployment component 122-1 may also upgrade the validation component 122-3 with a latest build of the new mailbox protection service. Thus, the simulated transactions are appropriate for testing the new mailbox protection service instance.

The logic flow 1000 may validate the upgrade to the deployment unit at block 1010. For example, the validation component 122-3 of the management application 120 may analyze test results from the simulated transactions. If the test results indicate successful completion of a substantial number of the tests, a portion of the email traffic is routed to the deployment unit, possibly, for further testing. One example implementation does not perform mailbox migration for any tenant associated with this portion and only changes the routing data to include endpoints associated with the new mailbox protection service instance.

In one example embodiment, the logic flow 1000 is repeated for subsequent deployment units in the data center. Once a deployment unit is configured for the new mailbox protection service instance, additional tenant email traffic is routed to the new mailbox protection service instance's endpoint.

Alternatively, endpoints associated with the new mailbox protection service only generate temporarily upon being associated with a first deployment unit. Email traffic from actually tenants are never routed to these endpoints. Instead, test tenants are associated with the endpoints and run end to end tests on these endpoints. Following the validation, the upgraded first deployment unit is migrated back to a production endpoint (e.g., an out-of-band of deployment upgrade). Since the new build of the mailbox protection service has been tested and validated for correctness and durability, subsequent deployment units are upgraded in a rolling fashion in-place (e.g., without being moved to test endpoints).

The embodiments are not limited to this example.

Figure 11:
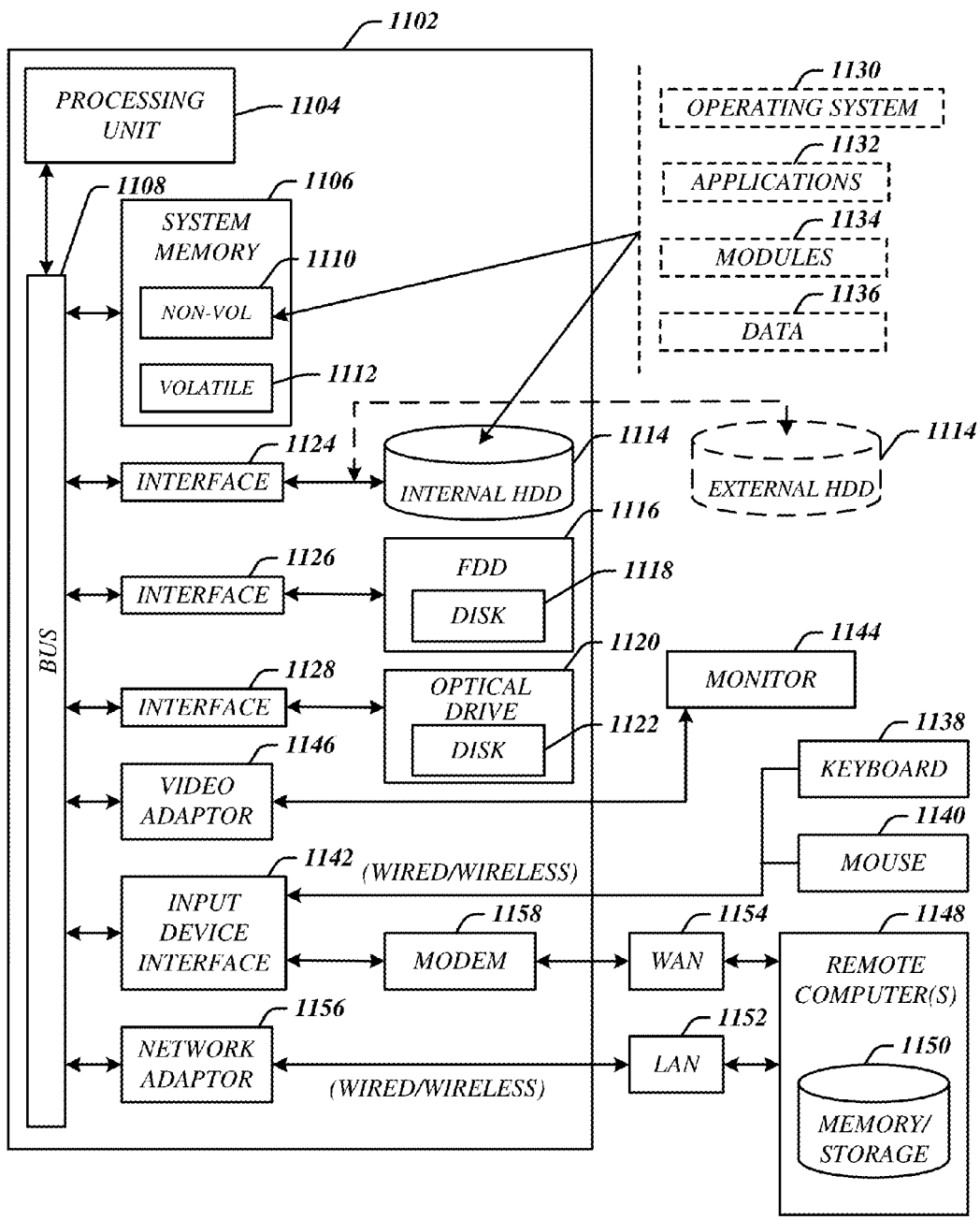
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
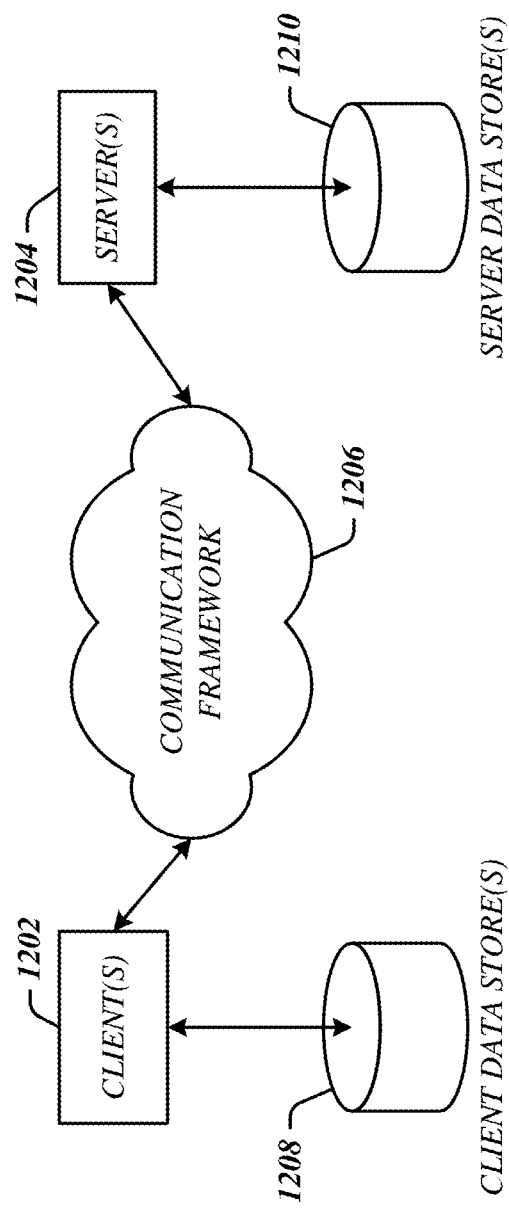
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor;
a set of memory units; and
a management application operative on the processor, the management application to comprise a deployment component arranged to partition a resource capacity into deployment units each having computing roles corresponding to execution of an online computing service to handle production traffic, migrate a deployment unit from a production endpoint into another endpoint, modify one or more computing roles associated with the deployment unit to generate a modified deployment unit on the other endpoint, and to utilize the modified deployment unit for at least a portion of the production traffic.

2. The apparatus of claim 1, comprising a validation component arranged to initiate simulated transactions with the modified deployment unit.

3. The apparatus of claim 1, comprising a discovery component to route the production traffic to the other endpoint.

4. The apparatus of claim 1, wherein the deployment component is operative to migrate the deployment unit to the production endpoint.

5. The apparatus of claim 1, comprising a discovery component to route a portion of the production traffic to the other endpoint and another portion of the production traffic to the production endpoint.

6. The apparatus of claim 1, wherein the deployment component is operative to apply a change to at least one computing role of a mailbox protection service for execution on the deployment unit, and create a new mailbox protection service instance.

7. The apparatus of claim 6, wherein the deployment component is operative to roll back the change to the at least one computing role.

8. The apparatus of claim 1, wherein the deployment component is operative to isolate production traffic associated with a subset of a plurality of users associated with the production traffic to the modified deployment unit.

9. The apparatus of claim 1, wherein the deployment component is operative to arrange the deployment unit to be a dedicated service instance to handle production traffic from a subset of a plurality of users associated with the production traffic.

* * * * *